United States Patent [19]

Ikeda et al.

[11] 3,969,536

[45] July 13, 1976

[54] METHOD FOR PREPARING JELLY FOODS

[75] Inventors: Terukazu Ikeda, Tokyo; Shintaro Moritaka, Kobe; Satohiko Sugiura; Tsutomu Umeki, both of Kawasaki, all of Japan

[73] Assignees: Takeda Chemical Industries, Ltd., Osaka; Nichiro Gyogyo Kaisha, Ltd., Tokyo, both of Japan

[22] Filed: Apr. 8, 1975

[21] Appl. No.: 566,518

[30] Foreign Application Priority Data
Apr. 9, 1974   Japan.............................. 49-40565

[52] U.S. Cl............................... 426/103; 426/565; 426/573
[51] Int. Cl.²............................................ A23L 1/04
[58] Field of Search............................ 426/573, 103

[56] References Cited
UNITED STATES PATENTS

| | | | |
|---|---|---|---|
| 3,493,382 | 2/1970 | Ryan | 426/573 |
| 3,754,925 | 8/1973 | Kimura et al. | 426/573 |

*Primary Examiner*—Jeanette M. Hunter
*Attorney, Agent, or Firm*—Wenderoth, Lind & Ponack

[57] ABSTRACT

A jelly food is prepared by successively
1. assembling more than two materials
2. heating the assembly to a temperature of not lower than 60°C and
3. cooling the same, said materials containing a thermally gelable polysaccharide composed predominantly of β-1,3-glycosidic groups and being prepared by holding a dispersion containing the polysaccharide at 55° to 80°C.

6 Claims, 2 Drawing Figures

METHOD FOR PREPARING JELLY FOODS

The present invention relates to assembled jelly foods and a method for their production.

The recent upgrading and diversification of eating habits have brought about an increasing demand for jelly sherbet and other desserts, particularly assembled jelly foods with multi-colors. In such jelly foods, gelatin and agar have commonly been employed as gelling agents but, because of some disadvantage or other, these agents have not provided fully satisfactory results. For example, when mixed with acidic ingredients such as fruit juices, gelatin is hardly gelable. Furthermore, as the melting point is low, it cannot be served as warm jelly foods. Moreover, once frozen, the product can hardly regain its inherent jelly properties, even if thawed. Thus, gelatin jelly cannot be stored in frozen conditions.

Agar, by nature, displays only poor gelability under acidic conditions. Besides, as is the case with gelatin jelly, agar products, once frozen, completely lose their jelly properties.

On the other hand, there were obtained some polysaccharides as fermentation products which are composed predominantly of $\beta$-1,3-glycosidic groups and capable of gelling upon heating in contrast with the aforesaid conventional gelling agents, and it is known that these polysaccharides are useful as gelling agents for foods (U.S. Pat. Nos. 3,754,925, and 3,822,250).

However, the gels obtained from such polysaccharides display only a poor adhesivity between individual bodies which, if once assembled, are readily separated. Thus, demand is ever increasing for laminar or other built-up foods which are excellent in bonding quality between gel bodies.

Under these circumstances the present inventors have made an intensive study which has culminated in this invention.

Thus, the first object of this invention is to provide assembled jelly foods which have a strong adhesivity between component gel bodies.

The second object of this invention is to provide a method for preparing such assembled jelly foods.

The further object of this invention will be clear in the following explanations. These objects are realized by assembling at least two of the same or different materials- each of which contains 0.5 to 5 weight percent of a thermally gelable polysaccharide composed predominantly of $\beta$-1,3-glycosidic groups, and each of which has been prepared separately by holding a dispersion containing said polysaccharide at a temperature of 55° to 80°C under stirring- such a manner that they are present independently from each other but in intimate contact with each other; heating the assembly to a temperature of not lower than 60°C; and subsequently cooling the assembly.

The term 'assembled jelly foods' as used throughout this specification and shown by FIGS. 1 and 2 means any jelly food assembled of gel blocks or bodies which may be of optional shape, transparent to opaque, or which contain air bubbles as they join to each other intimately and securely to present a given configuration, as well as a frozen version of said jelly products. Thus, for example, there may be mentioned fruit jelly, milk jelly, pudding, bavaroir, yoghurt-like jelly, fruit sherbet-like dessert, milk sherbet-type dessert and so on, which are assemblies of two or more constituent gel blocks, each of which may, for instance, be polyhedral, e.g. triangular-pyramidal, cubic, hexagonal-pyramidal, cylindrical, conical, spherical, tubular, and other shapes.

Figure 1:
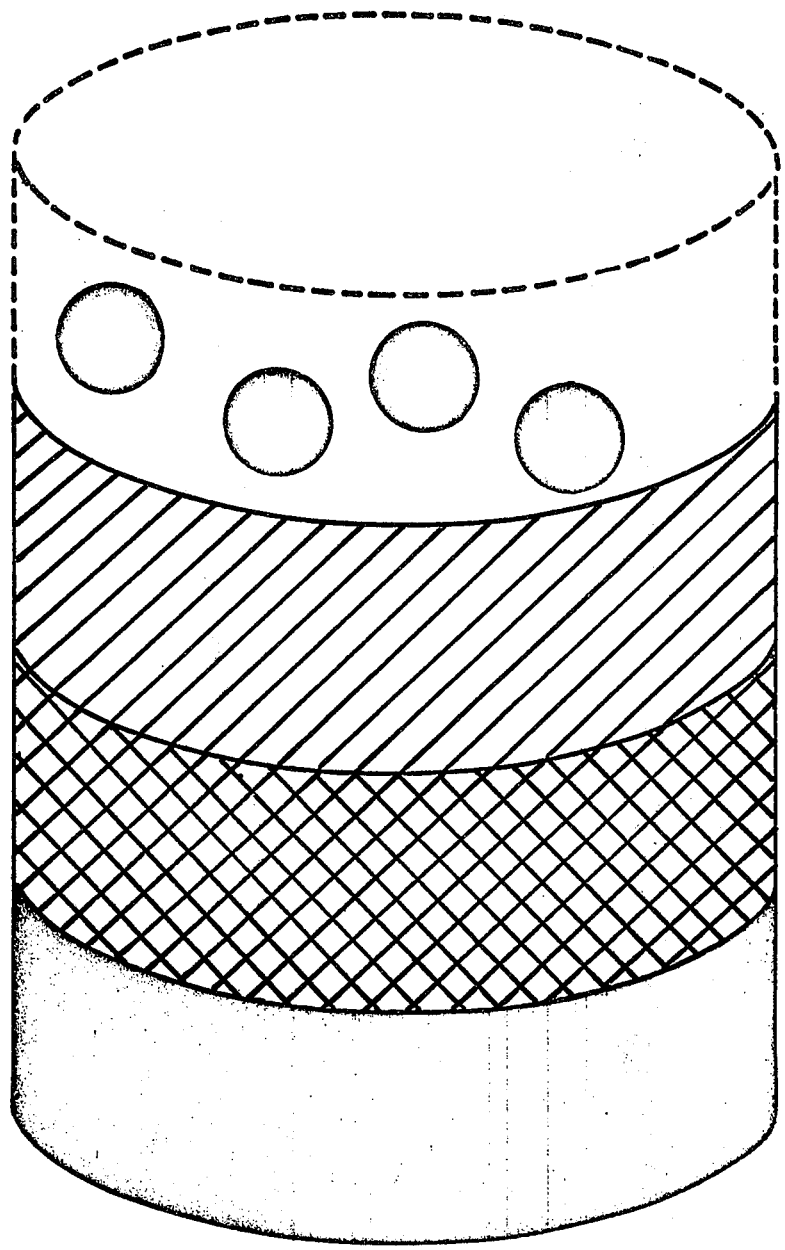
FIG. 1 shows a tubular gel block of four layers each of different materials.

The thermally gelable polysaccharides which are to be employed as a gelling agent in the method of this invention can be produced by cultivating a microorganism belonging to the genus Alcaligenes or the genus Agrobacterium according to the procedures described in U.S. Pat. Nos. 3,754,925 and 3,822,250. For example, polysaccharides A, B and C employed in the following experiments and examples are elaborated by *Agrobacterium radiobacter* IFO-13126(ATCC-21679), *Alcaligenes feacalis* var. *mixogenes* (NTK-u IFO-13140, ATCC-21680), and *Alcaligenes faecalis* var. *mixogenes* K. respectively (*IFO and ATCC numbers respectively denote the accession numbers at Institute for Fermentation*, 17–85, 2-chome, Jusohonmachi, Yodogawa-ku, Osaka, Japan and at American Type Culture Collection, 12501 Parklawn Drike, Rockville, Md. 20852, U.S.A.)

In accordance with this invention, a material containing such a polysaccharide in a proportion of 0.5 to 5 weight percent is first prepared. This polysaccharide-containing material is prepared by retaining a dispersion of the polysaccharide at 55° to 80°C under constant stirring. This temperature is retained under constant stirring. The stirring may be performed in a routine manner, for example by means of a stirrer or mixer.

That the suspension is retained or held at a temperature of 55° to 80°C means that it is sufficient to ensure that the temperature of the dispersion will finally fall within the said range, although it is not suitable to expose the system to any temperature in excess of 80°C even transiently throughout the process of preparing the aforementioned polysaccharide-containing material.

Thus, it is important to disperse the entire amount of the polysaccharide evenly in a suitable amount of water and, then, heat the dispersion to the required temperature. The heating may be achieved by adding hot water (This technique will hereinafter be referred to as 'hot-water pouring').

Alternatively, the dispersion may be directly heated.

As will be seen from Experiment 4 which appears hereinafter, it is important that the polysaccharide be contained in a proportion of 0.5 to 5 percent by weight. Any amount less than 0.5 weight percent or more than 5 percent results in a gel with inferior characteristics and provides only inadequate gel-to-gel adhesion.

To describe a specific procedure, one may first prepare an aqueous dispersion containing 0.5 to 5 weight percent of the polysaccharide (preferably about 0°C to about 50°C) and, then, heat the dispersion to 55°–80°C under stirring or, alternatively, pour hot water into an aqueous dispersion containing a suitable amount of the polysaccharide to adjust the polysaccharide concentration to 0.5 to 5 percent by weight and to a temperature of 55° to 80°C.

Since the gel-forming property of the polysaccharide in the practice of this invention is materialized over a significantly broad pH range, i.e. between pH about 2 to pH about 9, no special attention need be paid to pH in the preparation of said polysaccharide-containing material.

Furthermore, in this preparation, water containing an alcohol may be employed according to the contemplated products. If necessary, there may also be incorporated within the limits that will not be detrimental to the object of this invention such additives as natural sweeteners, e.g. sucrose, glucose, fructose, etc.; artificial sweetners, e.g. saccharin; acids, e.g. citric acid, malic acid, ascorbic acid, fumaric acid, etc.; suitable perfumes, colors, condiments, edible fats, foaming agents, and other natural matters and food additives including sorbitol, dextrin, carrageenan, starch, agar, gelatin, millet jelly, soy, chocolate, fresh cream, coffee, cocoa, vitaims, starch, wines and distillers' products, natural fruit juice, natural fruits and so on.

As a precaution, it is undersirable to add solid materials, e.g. natural fruits, etc., in excessive amounts. Thus these additives are preferably limited to an amount suitable for decoration, i.e. not more than about 10 percent by weight. In such instances, the proportionate amount of the polysaccharide may be reckoned from the total weight including the weight of such solid materials.

When a water-soluble food color is employed as a colorant, it could happen that the color migrates from the gel block or body containing it to another gel block adjacent thereto. If that is objectionable, a water-insoluble pigment such as a food color of the aluminum lake type or such a natural coloring material as $\beta$-carotine, chlorophyll, lykopene, Monascorubrin or the like may be successfully employed.

When, for example, it is desired to manufacture a jelly food incorporating a 'whipped' (foamed) gel as a component gel block, it is proper to employ a suitable foaming agent such as egg white, a vegetable or animal protein partial hydrolyzate, and a propylene glycol fatty acid ester.

While the polysaccharide-containing material thus far described is fluid when just prepared, it gains considerably in viscosity as it is allowed to stand and cool to 50°–40°C and forms a gel as it is cooled to 40°C or less. This cooling operation must be performed in standing condition, that is to say, without being accompanied by agitation. The cooling operation may involve allowing the system to cool spontaneously to room temperature or by forced cooling to a lower temperature, or by a combination of the two cooling methods. Since, as mentioned above, the product has a high viscosity, though it has not undergone gelation, at the internal temperature of 50°–40°C, the object of this invention can be fully accomplished unless another material is quickly superimposed thereon. For practical purposes, it is desirable to effect cooling to the internal temperature of 45°–10°C.

When the polysaccharide-containing material in liquid condition is directly put to use, it is dispensed into a suitable container to obtain the desired jelly product. As for said gel blocks or bodies, a liquid polysaccharide-containing mixture is poured into molds and cooled to obtain gel bodies of desired shape or, alternatively, a gelated mixture may be processed into desired shapes.

In accordance with this invention, the polysaccharide-containing materials which have been prepared separately or similarly in the afore-mentioned manner are assembled with each other in mutually discrete yet initimate relation.

For example, the combination of a polysaccharide-containing material (I) with another polysaccharide-containing material (II) for the production of a jelly product of the simplest construction, i.e. a bilayer product, will be explained. Thus, on a suitable amount of (I) in a suitable container, there is superimposed the second material (II). When (I) is liquid, it is preferable to allow (I) to stand and cool to a gel in the first place and, then, pour (II) in liquid state or superimposed a gel of (II) thereon.

One may superimpose the fluid (II) on fluid (I) and, in this case, if the specific gravity of (I) is previously increased over that of (II) by increasing the sugar content of the former, for instance, an intermingling of the two components can be prevented even when (II) is also liquid. When a gel of (I) is assembled with a gel of (II), it is advisable to allow the two liquid polysaccharide-containing materials to stand independently of each other until they cool to 10° to 30°C and assemble the resulting gels.

Then, in accordance with this invention, the combined or assembled polysaccharide materials are heated to a temperature of not lower than 60°C, and preferably, to 60° to 70°C, when both materials are solid and there is a contact face between gels in the assembly, or to 65°C or higher when the mode of assembly is other than the one just described, that is to say, when a liquid material is assembled with another liquid or a solid material.

If necessary, the assembled product is further heated to 80°C or higher, whereby the inherent thermal gelability of the polysaccharide is materialized to provide a thermally insolubilized gel or elastic product and, at the same time, pasteurization effects are accomplished.

After the above heat treatment, the product is cooled, preferably to a temperature not higher than 45°C whereby the contemplated jelly product is obtained. The cooling may be effected in the routine manner, or the product is chilled in a freezer in order to obtain a sherbet-like frozen food.

In preparing a frozen jelly, it is preferably, quality-wise, to carry out the heat treatment at a temperature of about 80°C or more as described above and freeze the resulting gel in which the inherent thermal gelability of the polysaccharide has been materialized.

In accordance with this invention, there are obtained a varitey of assembled jelly foods with ease and at low cost. The gels are highly stable in a broad pH range, given jelly of good quality under acidic conditions (e.g. pH 2 to 3). Particularly, there is realized a firm bond between gels upon assembling, with the individual gel bodies being difficult to take apart, so that a delicious taste emanating from a subtle blend of textures of gels can be obtained. Furthermore, by controlling the temperature of the resulting jelly product, a variety of foods such as cold jelly, warm jelly and frozen jelly can be obtained. For example, if a frozen laminar fruit jelly is served as such, it gives a taste and mouth-feel like that of a delicious sherbet but, if the frozen product is thawed, it reverts to a jelly. Thus, since freezing and thawing can be reversibly repeated, a large quantity of jelly can be safely stored in frozen condition.

Moreover, when the product is heated to a temperature of about 80°C or higher as described above, the inherent thermal gelability of the polysaccharide is materialized to yield thermally insoluble gels and an elastic product of such gel with an intimate bond. And the product, on freezing, yields an excellent frozen jelly. Thus, the product remains stable in quality even after a protracted time of storage.

This and other features make the present invention of considerable utility in the industry concerned.

The invention will hereinafter be described by the following experimental data and working examples.

EXPERIMENT 1

1. Test procedure

With the addition of 200 ml. of water of about 20°C, 3 g. of powdery polysaccharide B was stirred. The resulting suspension was heated under agitation and when the suspension had reached 65°C, the fluid was distributed into 4 containers, up to about half the capacity of each container. The containers were kept undisturbed, whereby the contents were allowed to cool to about 45°C (a) or about 10°C(b). At this moment, a fluid similarly prepared (65°C) was poured as a superlayer onto the partially cooled fluid in each container up to the brim. Then, products (I) were further allowed to cool, while products (II), with the containers covered, were heated to an internal product temperature of 80°C, at which level they were allowed to stand for 30 minutes. Then, the products were taken out and allowed to further cool at room temperature (about 20°C).

2. Test results

The test results are set forth below in the table. It is apparent that the conditions according to this invention are conducive to improve results.

Thus, while all the samples showed satisfactory formations of individual layers, there was a marked difference in the quality of interlayer bonds between the two groups of samples. Whereas the products obtained by the last-stage assembly and subsequent heat-treatment in the manner specified by this invention displayed far superior bonds between superimposed layers, the control samples which had not been subjected to such a heat treatment showed extremely poor adhesivity, being susceptible to delamination.

Similar experiments were carried out with polysaccharide A and polysaccharide C, respectively, in place of polysaccharide B. The results were comparable to the results obtained in the above example.

Table 1

| Test item | Formation of gel layers | | Bond between layers | |
|---|---|---|---|---|
| Sample | (a) | (b) | (a) | (b) |
| (I) Unheated (Controls) | ++ | ++ | – | – |
| (II) Heated (this invention | ++ | ++ | ++ | ++ |

Note:
–denotes a poor result;
++denotes a good result.

EXPERIMENT 2

1. Test procedure

With the addition of 50 ml. of water of about 20°C, 3 g. of powdery polysaccharide B was stirred. To the resulting dispersion was added 150 ml. of hot water and the mixture was agitated to prepare a fluid with an internal temperature of 65°C.

The fluid was distributed into four containers up to about half the capacity of each container and allowed to stand and cool. When the temperature of the contents had become about 45°C (a) or about 10°C(b), a fluid prepared in the same manner as above (65°C) was poured into each of the containers up to the brim to form a superlayer. Then, as shown below in the table, samples (I) were allowed to cool as they were while samples (II) were heated with the containers covered.

After the latter samples had attained a temperature of 80°C, they were held at that temperature for 30 minutes. The samples were then taken out and allowed to cool at room temperature (about 20°C).

2. Test results

The test results are set forth below in the table. It is clear that conditions according to this invention are conducive to improved results. Thus, as in Experiment 1, all the samples displayed excellent formations of gel layers but there was a marked difference in the quality of interlayer bond or adhesivity. Whereas the samples obtained by the last-stage assembly and subsequent heat-treatment in the manner specified by this invention displayed excellent adhesivity, the control samples which had not been subjected to such a heat treatment showed poor interlayer adhesivity, being susceptible to delamination. Similar experimetns were carried out with polysaccharide A or polysaccharide C in place of polysaccharide B. The results were comparable to the above results.

Table 2

| | Test Item | | | |
|---|---|---|---|---|
| | Formation of gel layers | | Bond between layers | |
| Sample | (a) | (b) | (a) | (b) |
| (I) Unheated (controls) | ++ | ++ | – | – |
| (II) Heated (this invention) | ++ | ++ | ++ | ++ |

Note:
– denotes a poor result;
++ denotes a good result.

EXPERIMENT 3

1. Test procedure

To 3 g. of powdery polysaccharide B was added water of about 20°C, followed by stirring. With the addition of boiling water, the resulting dispersion (200 ml.) was stirred to prepare samples having the internal temperatures indicated below in the table. The internal temperatures are arranged by changing the ratio of the amount of said boiling water and that of water of about 20°C. Each of the resulting fluids was distributed into a container up to about half the capacity and allowed to stand and cool. When the temperature of each sample had reached about 45°C, fluid samples similarly prepared and having the comparable temperatures were poured over the previous corresponding fluid layers to the full capacity of each container. Then, the products were heated with the containers covered to 80°C, at which level they were held for 30 minutes. Then, the products were taken out and allowed to cool at room temperature (about 20°C).

2. Test results

The test results are set forth below in the following table. It is clear that the conditions according to this invention are conducive to improved results. Thus, whereas the preparation of polysaccharide-containing materials at product temperatures of 55° to 80°C as specified by this invention resulted in better formation of gel layers and more satisfactory interlayer bonds, the control samples prepared at the product temperatures below 55°C or in excess of 80°C were definitely inferior.

Similar experiments were carried out with polysaccharide A or polysaccharide C in place of polysaccharide B. The results obtained were similar to the above results.

Table 3

| No. | Temperature of prepared fluid as such (°C) | Test Item Formation of gel layers | Bond between layers |
|---|---|---|---|
| 1 | 90 | − | − |
| 2 | 85 | − | − |
| 3 | 80 | + | + |
| 4 | 75 | ++ | ++ |
| 5 | 65 | ++ | ++ |
| 6 | 55 | ++ | ++ |
| 7 | 50 | − | − |

Note:
− denotes a poor result;
++ denotes a good result.

EXPERIMENT 4

1. Test procedure

To powdery polysaccharide B was added 50 ml. of water of about 20°C and, then, 150 ml. of hot water was further added to the resulting suspension with stirring to prepare sample fluids with the various polysaccharide concentrations indicated below in the table and having an internal temperature of 65°C. Each of the fluids thus obtained was poured into a container up to about half the capacity and allowed to stand and cool to 45°C.

At this moment, fluid samples prepared in the same manner as above and containing the polysaccharide in various concentrations were poured into the containers containing the fluids of the corresponding polysaccharide concentrations up to the brim of each container to form superlayers.

Then, each bilayer sample was heated to 80°C with the container covered and held at that temperature for 30 minutes. Thereafter, the samples were taken out and allowed to stand and cool at room temperature (about 20°C).

2. Test results

The test results are set forth below in the table. It is clear that the conditions according to this invention are conducive to improve results. Thus, the use of a material containing 0.5 to 5 % (by weight) of the polysaccharide as specified by this invention provides better formation of gel layers and improved bonding between superimposed layers, while control samples whose polysaccharide concentrations were either less than 0.3 % or in excess of 5 % displayed inferior results. In particular, at the polysaccharide level of 0.3 %, the sample did not form a gel and at 7 %, there could not be obtained a homogeneous gel.

Similar experiments were performed with polysaccharide A or polysaccharide C instead of polysaccharide B. The results were similar to those obtained above.

Table 4

| No. | Polysaccharide concentration (wt.%) | Test Item Formation of gel layers | Bond between layers |
|---|---|---|---|
| 1 | 0.3 | − | − |
| 2 | 0.4 | ± | ± |
| 3 | 0.5 | + | + |
| 4 | 1 | ++ | ++ |
| 5 | 2 | ++ | ++ |
| 6 | 3 | ++ | ++ |
| 7 | 5 | ++ | ++ |
| 8 | 6 | ± | ± |
| 9 | 7 | − | − |

Note:
− and ± denote inferior results;
+ and ++ denote superior results.

EXPERIMENT 5

1. Test procedure

To 3 g. of powdery polysaccharide B was added 50 ml. of water of about 20°C with stirring. With the addition of 150 ml. of hot water, the resulting dispersion was agitated to prepare a fluid having a temperature of 60°C. The fluid was distributed into containers up to about half the capacity and allowed to stand and cool. When the temperature of each fluid had reached 45°C, a fluid prepared in the same manner as above (60°C) was added up to the full capacity of the container.

Then, with the container covered, the samples were held at the various temperatures (the temperatures of samples) indicated in Table 5, after which time they were allowed to stand and cool at room temperature (about 20°C). The adhesivity or bond between superimposed layers was then investigated. In this experiment, heating was carried out at atmospheric pressure for samples heated to 100°C or less and at elevated pressure for samples heated at temperatures in excess of 100°C.

2. Test results

The test results are set forth below in the table. It is clear that the conditions according to this invention are conducive to improved results. Thus, it was found that where there was no contact face between gels in the assembly of polysaccharide-containing materials, a superior bond between gels was obtained if the combination was held at a temperature of 65°C or more. At temperatures lower than 65°C, the bond was poor with the gels being susceptible to delamination. Similar experiments were also carried out with polysaccharide A or polysaccharide C instead of polysaccharide B. The results were similar to those attained in the above experiments.

Table 5

| Temperature of sample (°C) | Retention Time | | | | | | |
|---|---|---|---|---|---|---|---|
| | 10 min. | 20 min. | 30 min. | 40 min. | 60 min. | 90 min. | 120 min. |
| 60 | | | | − | − | − | + |
| 65 | | | | + | ++ | ++ | ++ |
| 70 | | − | + | ++ | | | |
| 80 | | − | ++ | ++ | | | |
| 100 | − | ++ | ++ | | | | |
| 110 | ++ | ++ | | | | | |
| 120 | ++ | ++ | | | | | |
| 130 | ++ | | | | | | |

Note:
− denotes a poor result;
+ and ++ each denote a satisfactory result.

EXPERIMENT 6

1. Test procedure

To 3 g. of powdery polysaccharide B was added 50 ml. of water of about 20°C, followed by stirring.

With the addition of 150 ml. of hot water, the resulting dispersion was agitated to prepare a fluid with a temperature of 65°C. The fluid was allowed to stand and cool in a refrigerator to obtain a polysaccharide-containing material with a temperature of 10°C.

Another fluid prepared in the same manner as above (65°C) was similarly allowed to stand and cool in a refrigerator to prepare a gelated polysaccharide-containing material with a temperature of 10°C. In containers, the two materials were combined in the form of layers so that the two gels were positioned in intimate contact with each other. The containers were covered and held at the various temperatures (temperatures of samples) indicated below in the table. Thereafter, each sample was taken out and allowed to stand and cool at room temperature (about 20°C). The adhesivity or quality of bond between the superimposed layers was then investigated.

2. Test results

The results of the above experiment are set forth below in the table. Thus, when there was a contact face between gels in the assembly of polysaccharide-containing materials, heat-treatment at a temperature between 60° and 70°C (temperature of product) resulted in a superior bond between gels. At temperatures below 60°C or in excess of 70°C, the resulting bond was invariably poor, the gels being susceptible to delaminated.

Similar experiments were also carried out with polysaccharide A or polysaccharide C instead of polysaccharide B. The results were similar to those obtained in the above experiment.

Table 6

| No. | Temperature of Sample (°C) | Heating time 30 min. | 60 min. |
|---|---|---|---|
| 1 | 55 | − | − |
| 2 | 60 | ++ | ++ |
| 3 | 65 | ++ | ++ |
| 4 | 70 | ++ | ++ |
| 5 | 75 | + | + |

Note:
− denotes a poor result;
++denotes a very good result,
+ denotes a good result

EXAMPLE 1

To a jelly composition of 25 g. of sucrose, 20 g. of glucose, 1.25 g. of citric acid, 0.25 g. of ascorbic acid, 0.5 g. of orange flavor, 0.02 g. of $\beta$-carotine and 2.5 g. of powdery polysaccharide B, there was added 200 ml. of water of about 30°C. After thorough mixing, the dispersion was heated under agitation to prepare a fluid with a temperature of about 65°C. The fluid was distributed into containers up to about half their capacity and allowed to stand and cool. When the temperature of the fluid had reached about 40°C, a fluid prepared in the same manner as above and with a temperature of about 65°C (except that it contained 0.5 g. of melon flavor and 0.15 g. of chlorophill instead of the aforementioned orange flavor and $\beta$-carotine) was layered onto the above orange-flavored fluid up to the brim of the container to form a superlayer. Then, with the container covered, each product and container was heated in the routine manner. When the temperature of the product had reached about 80°C, the product and container was held at that temperature for 30 minutes. Then, the product was taken out and cooled in a refrigerator.

The jelly product thus obtained is of good quality, consisting of two layers, i.e. an orange and a melon layer, and showing an excellent interlayer bond. When, after the above fluid-pouring procedure was repeated, the same heat-treatment was carried out at the last stage, there was easily obtained a multi-layer (3 or 4-layer) jelly of good quality with firm interlayer bonds (see FIGS. 1 and 2).

Figure 2:
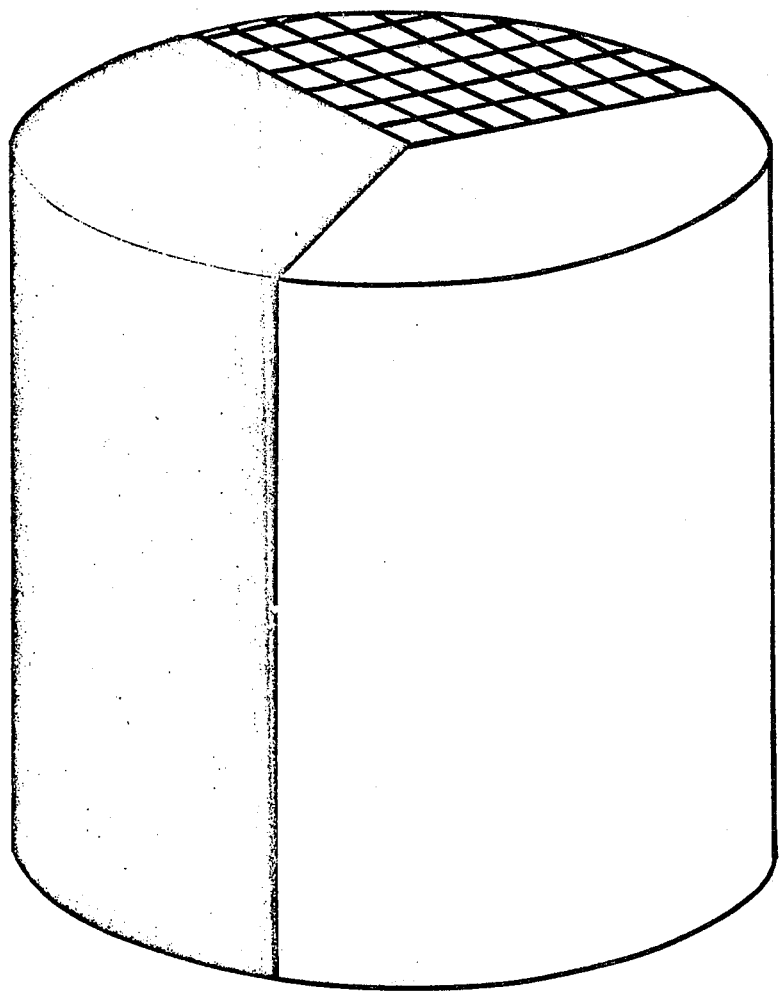
FIG. 2 shows a tubular gel block having three triangular-pyramidal sections each of different materials.

In the figures different shades represent different layers and the poka dots of FIG. 1 denote a solid component contained in the layer (e.g. fruit bodies, bean past, etc.).

When, in the above cooling procedure, the product was directly frozen, there was readily obtained a delicious layered sherbet-like dessert. Upon thawing, the frozen product reverted to a multi-layer jelly of good quality with a firm interlayer bond.

Similar products were also prepared from polysaccharide A and polysaccharide C instead of polysaccharide B. The results were similar to the products obtained in the above example (The same was true of the examples described hereinafter).

EXAMPLE 2

To the same orange-flavored jelly composition as described in Example 1 was added 50 ml. of water of about 30°C and, after thorough mixing, 150 ml. of boiling water was added with stirring to prepare a fluid with a temperature of about 65°C. The fluid was distributed into containers up to about half the capacity and allowed to stand and cool. When the contents of each container had attained a temperature of about 40°C, a fluid (with a temperature of about 65°C) prepared by subjecting the same melon-flavored jelly component as that used in Example 1 to a hot-water treatment similar to that above was layered onto the above orange-flavored fluid to the brim of each container. Then, with each container covered, the product was heated to about 80°C, at which level it was held for 30 minutes. The product was then taken out from the container and cooled in a refrigerator.

The resulting jelly product was of good quality, consisting of two superimposed layers, i.e. an orange and a melon-flavored layer, with a firm interlayer bond. When, after the same fluid-pouring procedure was repeated and a heat-treatment similar to that described above was carried out as a final step, there was easily obtained a multi-layer (three or four-layer) jelly product with firm interlayer bonds.

Moreover, a cylindrical or rectangular varigated-layer jelly product with firm interlayer bonds was easily obtained by the steps of fitting a cylindrical core or a linear divider into a container, pouring a first fluid into one of the compartments, allowing the fluid to stand and cool to form a gel, removing the core or divider, pouring a second fluid into the other compartment, heat-treating the same fluid in the same manner as above and, finally, cooling it.

When, instead of the above cooling in a refrigerator, the product was frozen, a delicious laminar sherbet-like dessert was obtained. This product, on thawing, again yielded a laminar jelly of good quality with a firm interlayer bond.

EXAMPLE 3

The same orange-flavored and melon-flavored fluids as those used in Example 1 or Example 2 (with a temperature of about 65°C each) were independently allowed to stand and cool in a refrigerator to prepare jelly with a temperature of about 10°C. The jelly was cut into suitable shapes, which were then assembled in a container in such a manner that each gel was held intimately against the adjacent gel as superimposed layers. Then, with the container covered, the contents were heated in the routine manner to a product temperature of about 65°C. The contents were maintained at this temperature for 30 minutes, whereupon the interlayer bonds were considerably strengthened. When the laminar jelly with thus-improved interlayer bonds was further heated and maintained at a product temperature of 90°C for 30 minutes, there was obtained a laminar jelly with firm interlayer bonds, an excellent mouth-feel, stabilized quality and improved shelf-life. Furthermore, when this product was cooled until it was frozen, it was converted to a delicious laminar sherbet-like dessert which, on thawing, yielded a laminer jelly with excellent interlayer bonds. Thus, by selecting suitable combinations of gels, a large variety of desserts could be easily obtained.

EXAMPLE 4

In the same orange-flavored jelly fluid as that used in Example 2, there was placed a decorating amount of mandarin-orange pulp, while a few slices of melon were put in the same melon-flavored fluid as used in the same Example. Then, the procedure of Example 2 was repeated to prepare a laminar jelly. The procedure yielded a fruit jelly with a firm interlayer bond, pleasing to the palate and attractive to look at.

EXAMPLE 5

To a mixture of 90 g. of sucrose, 0.5 g. of citric acid and 7 g. of powdery polysaccharide B was added 150 ml. of water of about 30°C and, after thorough mixing, 300 ml. of boiling water was added under stirring, whereby a fluid with a temperature of about 60°C was obtained. The fluid was put in a container up to about half its capacity and allowed to stand and cool. When the temperature of the contents reached about 40°C, a foamed solution was added to fill the container as a superlayer.

The foamed solution was prepared in the following manner. Thus, to a mixture of 90 g. of sucrose, 0.5 g. of citric acid, 4 g. of a foaming agent (manufactured by A.E. Staley Msg. Co. O.S.; brand name: Foamable Protein D-100 WA) and 12 g. of powdery polysaccharide B was added 100 ml. of cold water of about 20°C and after thorough whipping, 300 ml. of hot water was added with gentle stirring to prepare the solution having a temperature of about 60°C. Then, with the container covered, the contents were held at a product temperature of 90°C for 30 minutes, and cooled. The procedure yielded a laminar jelly, the lower layer of which was a jelly with the upper layer being a foamed jelly, with a firm interlayer bond and a delicious taste.

EXAMPLE 6

To a mixture of 50 g. of sucrose and 5.0 g. of powdery polysaccharide B was added 150 ml. of natural fruit juice of about 20°C and after thorough mixing, 300 ml. of boiling water was added under stirring. The fluid was put in a container up to about half its capacity and allowed to stand and cool. When the temperature of the contents reached about 45°C, untreated powdery polysaccharide B was spread onto the surface in an amount of about 1 mg. per square centimeter. Then, a second material was added to fill the container.

The second material was prepared in the following manner. Thus, to a mixture of 50 g. of sucrose and 5.0 g. of powdery polysaccharide B, was added 150 ml. of milk of about 20°C, and after thorough mixing, 300 ml. of boiling water was added with mixing, to fill the container. Then, with the container covered, the contents were held at about 80°C for 30 minutes and cooled.

The procedure yielded a laminar jelly, with the lower layer of a fruit jelly and the upper layer of a foamed jelly.

EXAMPLE 7

To a mixture of 50 g. of sucrose and 5 g. of powdery polysaccharide B or a mixture of 50 g. sucrose, 6.5 g. of powery polysaccharide B and 5 g. of starch was added 150 ml. of natural fruit juice of about 35°C and, after thorough mixing, 300 ml. of boiling water or 1.5 g. of agar dissolved in 300 ml. of boiling water was added with mixing. The fluid was poured in a container up to about half its capacity and allowed to stand and cool. When the temperature of the contents reached about 40°C, untreated powdery polysaccharide B was spread onto the surface in an amount of 1 mg. per square centimeter. Then, a second material of about 65°C was added to fill the container.

The second material was prepared in the same manner as the first material, except milk was employed in place of natural fruit juice.

Then, with the container covered, the contents were held at about 80°C for 30 minutes and cooled in a refrigerator. The procedure yielded a laminar jelly with the lower layer of a fruit jelly and the upper layer of a milk jelly.

EXAMPLE 8

To a mixture of 50 g. of sucrose, 6.5 g. of powdery polysaccharide B and 5 g. of starch was added 150 ml. of natural orange juice of about 20°C and, after thorough mixing, 300 ml. of boiling water was added with mixing. The fluid was poured into about one third of the container and allowed to stand and cool. When the temperature of the contents reached about 45°C, untreated powdery polysaccharide B was spread onto the surface in an amount of about 1 mg. per square centimeter. A second material of about 65°C was added thereto up to two thirds of the capacity of the container. The second material was prepared in the following manner. Thus, to a mixture of 50 g. of sucrose and 5 g. of powdery polysaccharide B was added 150 ml. of milk of about 20°C and, after thorough mixing, 300 ml. of boiling water was added to evaluate the temperature to 65°C.

A third material of about 65°C was prepared in the following manner and added thereto to fill the container. Thus to a mixture of 50 g. of sucrose and 6.5 g. of powdery polysaccharide was added 150 ml. of natural pine juice of about 35°C and, after through mixing, 1.5 g. of agar dissolved in 300 ml. of boiling water was added. Then, with the container covered, the contents were held at 80°C for 30 minutes and allowed to stand and cool. The procedure yielded a laminar jelly with a firm interlayer adhesivity and a delicious taste.

What we claim is:

1. A method for preparing a jelly food, which comprises (1) separately preparing at least two mixtures each of which contains from 0.5 to 5 weight % of a thermally gelable polysaccharide predominantly composed of $\beta$-1,3-glycosidic groups, (2) separately maintaining each of the mixtures within the temperature range of from 55° to 80°C under stirring to disperse the polysaccharide in each of the mixtures, (3) assembling the resultant mixtures in a manner such that each mixture is independent from each of the other mixtures but in intimate contact with at least one of the other mixtures, (4) heating the resultant assembly to a temperature not less than 60°C, and (5) cooling the heated assembly.

2. A method according to claim 1, wherein the heated assembly is cooled to a temperature of not higher than 45°C.

3. A method according to claim 1, wherein the interface of each mixture has been previously powdered with the same but untreated polysaccharide before assembling mixtures.

4. A method according to claim 1, wherein, in step 3, a first mixture in the liquid state is assembled with a second mixture in the liquid state or with a solid mixture, said assembly taking place in a container, and, in step 4, the assembly is heated to a temperature of at least 65°C.

5. A method according to claim 1, wherein, in step 3, a first mixture in the solid state is assembled with a second mixture in the solid state, and, in step 4, the assembly is heated to a temperature of from 60° to 70°C.

6. An assembled jelly food prepared by a method which comprises (1) separately preparing at least two mixtures each of which contains from 0.5 to 5 weight % of a thermally gelable polysaccharide predominantly composed of $\beta$-1,3-glycosidic groups, (2) separately maintaining each of the mixtures within the temperature range of from 55° to 80°C under stirring to disperse the polysaccharide in each of the mixtures, (3) assembling the resultant mixtures in a manner such that each mixture is independent from each of the other mixtures but in intimate contact with at least one of the other mixtures, (4) heating the resultant assembly to a temperature not less than 60°C, and (5) cooling the heated assembly.

* * * * *